United States Patent [19]

Bland et al.

[11] Patent Number: 5,960,441
[45] Date of Patent: Sep. 28, 1999

[54] SYSTEMS AND METHODS FOR PROVIDING DYNAMIC DATA REFERENCING IN A GENERIC DATA EXCHANGE ENVIRONMENT

[75] Inventors: Dennis L. Bland; Sean C. Koontz; Gary L. Fox; James A. Strilich, all of Phoenix, Ariz.

[73] Assignee: Honeywell Inc., Minneapolis, Minn.

[21] Appl. No.: 08/719,022

[22] Filed: Sep. 24, 1996

[51] Int. Cl.[6] .................................................. G06F 17/30
[52] U.S. Cl. ......................... 707/104; 707/103; 707/100; 395/500
[58] Field of Search .................................. 707/100, 102, 707/104, 103; 395/500

[56] References Cited

U.S. PATENT DOCUMENTS

| | | | |
|---|---|---|---|
| 4,736,321 | 4/1988 | Brown et al. | 364/300 |
| 5,175,854 | 12/1992 | Cheung et al. | 395/600 |
| 5,293,631 | 3/1994 | Rau et al. | 395/700 |
| 5,303,367 | 4/1994 | Leenstra, Sr. et al. | 707/102 |
| 5,333,298 | 7/1994 | Bland et al. | 395/500 |
| 5,475,836 | 12/1995 | Harris et al. | 395/681 |
| 5,499,188 | 3/1996 | Kline et al. | 364/468.13 |
| 5,542,070 | 7/1996 | LeBlanc et al. | 395/500 |
| 5,606,657 | 2/1997 | Dennison et al. | 707/1 |

Primary Examiner—Thomas G. Black
Assistant Examiner—Charles L. Rones
Attorney, Agent, or Firm—David H. Hitt; William A. Munck

[57] ABSTRACT

For use with a computer system having a dynamic data referencing (DDR) module, a plurality of external data references accessible via the DDR module, the computer system capable of executing a user application that operates on a plurality of generic variables, a system and method for dynamically binding the external data references to the generic variables. The system includes a DDR routine within the user application that allows creation of an alias variable for at least some of the plurality of generic variables. The alias variable is adapted to identify a given external data reference. The user application employs the alias variable at runtime to request the DDR module to bind a given generic variable to the given external data reference to allow communication of data between the user application and the external references.

26 Claims, 5 Drawing Sheets

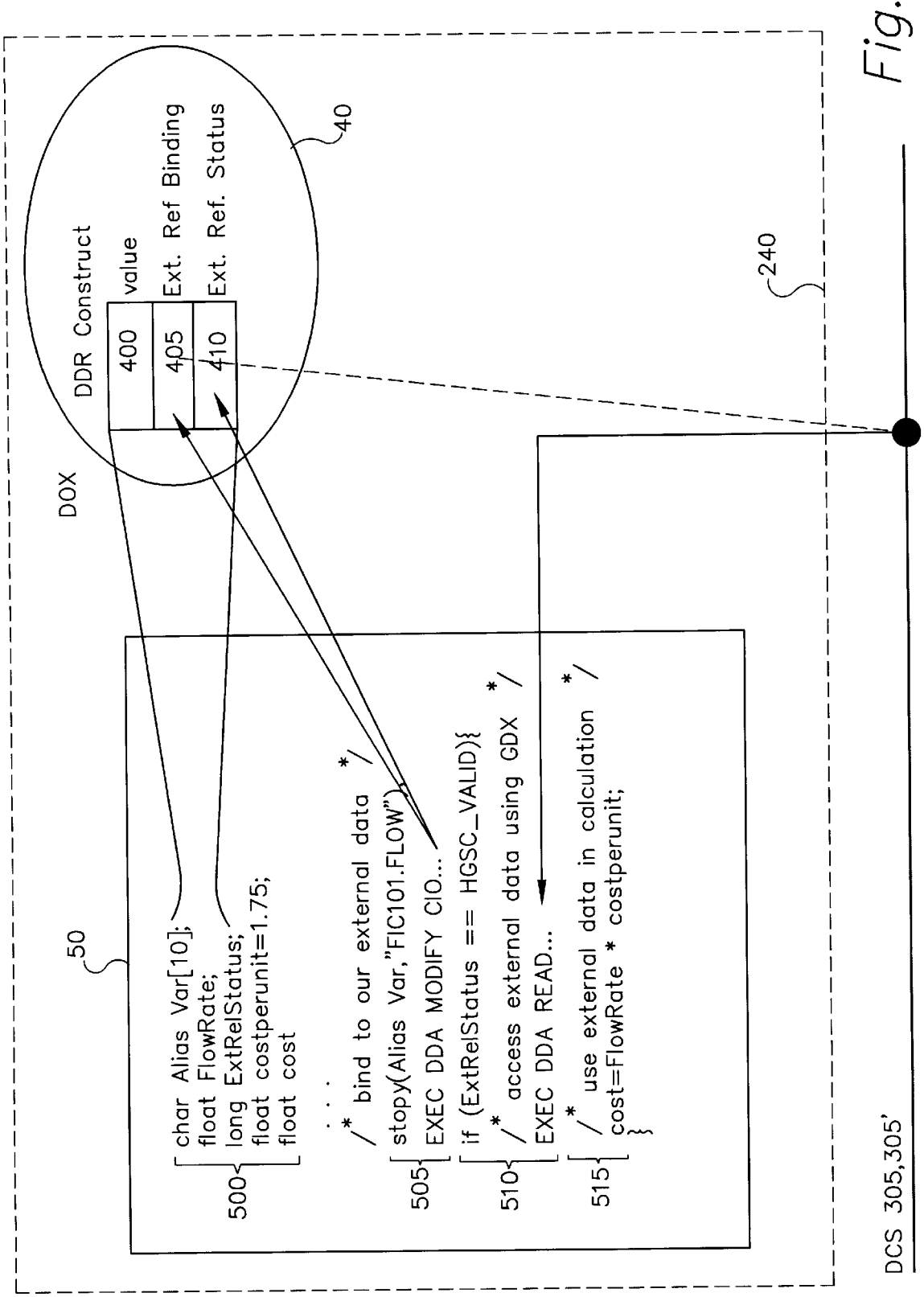

SYSTEMS AND METHODS FOR PROVIDING DYNAMIC DATA REFERENCING IN A GENERIC DATA EXCHANGE ENVIRONMENT

CROSS-REFERENCE TO RELATED APPLICATIONS

The present invention is related to that disclosed in U.S. Pat. No. 4,607,256 issued to Henzel, on Aug. 19, 1986, entitled "Plant Management System;" and U.S. Pat. No. 5,333,298 issued to Bland, et al., on Jul. 26, 1994, entitled "System for Making Data Available to an Outside Software Package by Utilizing a Data File which Contains Source and Destination Information," each reference is commonly assigned with the present invention and incorporated herein by reference for all purposes.

TECHNICAL FIELD OF THE INVENTION

The present invention is directed, in general, to computing and processing systems and, more specifically, to computing and processing systems that provide data access to a distributed process control system which utilizes external data references.

BACKGROUND OF THE INVENTION

Automated plant control systems (e.g., TDC 3000 Industrial Automation Systems manufactured by, and commercially available from, Honeywell Inc. of Phoenix, Ariz.) include a comprehensive set of algorithms and auxiliaries to control and monitor various processes within, for instance, a manufacturing facility. The control systems can be tailored to satisfy a wide range of process requirements globally or within specified portions of the facility. Conventionally, the control systems include a variety of modules, each having its own processor or firmware, linked together by a communication bus to result in a distributed process control system. The distributed nature of the system affords high performance with the capability to expand the system incrementally to satisfy growth or modifications in the facility.

A first objective of automated plant management is to provide a control scheme that synthesizes plant-wide control of all processes to thereby improve an overall efficiency of the facility. Regarding this objective, U.S. Pat. No. 4,607,256 (the "'256 Patent") provides a plant-wide system for monitoring and controlling an industrial or electrical utility plant, including communication within the system and the related management of the processes within the plant. More specifically, the plant management system incorporates a "token-passing" arrangement employing separate modules of various types. A module transmits information to or receives information from another module located on a common bus. Each of the modules functions as a peer within the network and is assigned an individual network address. A token passed among the modules gives the module that possesses the token the right to access the bus and transmit a signal to the address of another module located on the bus. Automated control systems, such as the one disclosed in '256 Patent, are well known in the art.

A second objective of automated plant management is to support a control scheme that provides a common communication interface for various sources of data from a variety of applications performing various plant process functions. Regarding this objective, U.S. Pat. No. 5,333,298 (the "'298 Patent") provides a method of data transfer having a generic data exchange ("GDX"). The '298 Patent provides a control scheme having a computer system in operative communication with a variety of predefined peripherals and, more particularly, such communication is through GDX logic associated with the computer system that permits an outside, or third-party, application package to be integrated into the computer system.

Typically, the defined source of any data of the outside application package is different from the source of any necessary data in the computer system. The GDX accordingly provides the necessary data between the outside application package and the computer system while the outside application package is executing. The GDX allows high-level user applications to bind with external data references. The GDX selects external data references to access either before executing the outside application or by using a separate executing process. Automated control systems employing GDX logic, such as the one disclosed in the '298 Patent, are well known in the art.

Unfortunately, conventional methods tend to be either project-specific or data source/destination specific thereby providing an inflexible data exchange. Traditionally, support for external data references has been provided either statically or dynamically. If support is static, once these external data references are established, they may not be altered at run-time, examples include custom DYNAMIC MATRIX CONTROL CORPORATION controllers, DCMi, ABE, OpenDDA 100 and OpenDDA 110. If support is dynamic, external data reference selection is flexible and dynamic at run-time for a single data source/destination, other data sources/destinations are unavailable, examples include AM, CM50S and CM50N.

Therefore, what is needed in the art is a more powerful and flexible form of data access that supports dynamic external data reference binding within advanced application development (e.g., high-level programming language) and is suitably independent of a specific data source/destination.

A further need in the art is a means by which a user program can control which external data reference to access at run-time.

A still further need in the art is a means by which a user program can redirect such external data reference access during run-time for any external data reference or set of references.

SUMMARY OF THE INVENTION

To address the above-discussed deficiencies of the prior art, it is a primary object of the present invention to provide dynamic data referencing ("DDR") that enables run-time binding of external data references within advanced application development, thereby providing a user program to control which external data reference to access at run-time, and to redirect such external data reference access during run-time for any external data reference or set of data references.

In the attainment of the above primary object, the present invention provides, for use with a computer system having a DDR module, a plurality of external data references accessible via the DDR module, the computer system capable of executing a user application that operates on a plurality of generic variables, a system and method of operating the system for dynamically binding the external data references to the generic variables. The system includes a DDR routine within the user application that allows creation of an alias variable for at least some of the plurality of generic variables. The alias variable is adapted to identify a given external data reference. The user application employs the alias variable at runtime to request the DDR module to bind a given generic variable to the given external data reference to allow communication of data between the user application and the external reference.

The use of the alias variable of the present invention allows a user application to modify one or more external data references at run-time. In an advantageous embodiment, an external data statement is used to associate one or more native high-level language variables of an application program with one or more of the various components, or properties, of one or more external data references, and to associate the one or more native high-level language variables with a selection set (i.e., organize external data references into logical groups for operation thereon). A normal, or conventional, building of the application is performed. At run-time, the names of one or more desired external data references are associated with one or more alias variables, and the same is communicated with transferring data between the application program and the external data reference. Use of the alias variable provides a means of performing run-time binding of external data references within advanced application development according to the present invention.

In an advantageous embodiment of the present invention, the DDR routine further allows creation of a data variable, the data variable adapted to contain a value of a given external data reference. The data variable may be an application variable that by definition holds data from an external source that is to be operated on by one or more applications.

In an advantageous embodiment of the present invention, the DDR routine further allows creation of an external reference status variable, the external reference status variable adapted to contain a status of a binding between the given generic variable and the given external data reference. The external reference status variable may be an application variable that by definition holds the status of the dynamic binding between a given external data reference associated with a given alias variable and a given data variable.

In an advantageous embodiment of the present invention, the DDR routine stores runtime-determined bindings for reuse. This facilitates processing efficiency and resource conservation as successive distinct uses of particular external data reference sources do not require reinstantiation.

In an advantageous embodiment of the present invention, the DDR routine stores an indication of current runtime-determined bindings in effect for the user application. Through the use of a defined, constant token, indication of bindings not in effect (i.e. "null" bindings) can be determined. Likewise, the indication of active bindings is accomplished by restoring specific alias variables with their associated external reference binding.

In an advantageous embodiment of the present invention, the DDR routine is associated with a plurality of separate user applications executing on the computer system. The principles of the present invention may advantageously be incorporated into and used in a multi-user environment.

In an advantageous embodiment of the present invention, the computer system is at least a portion of a real-time, process control system, the external data references corresponding to sensors and controllable devices of the process control system. The principles of the present invention are particularly adaptable and useful in association with automated plant control systems.

An advantageous embodiment for using or distributing the present invention is as software. The software embodiment includes a plurality of processing system instructions that are stored to a conventional storage medium. Preferred storage media include without limitation magnetic, optic and electric, as well as suitably arranged combinations of the same. The processing system instructions are readable and executable by one or more of the above-identified processing systems to provide DDR that enables run-time binding of external data references within advanced application development in accordance with the principles of the present invention to provide a user program to control which external data reference to access and redirect such external data reference access for any external data reference or set of references, all during run-time.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which like numbers designate like parts, and in which:

FIG. 5 illustrates an exemplary source code listing of an exemplary generic control process application.

DETAILED DESCRIPTION

Figure 1:
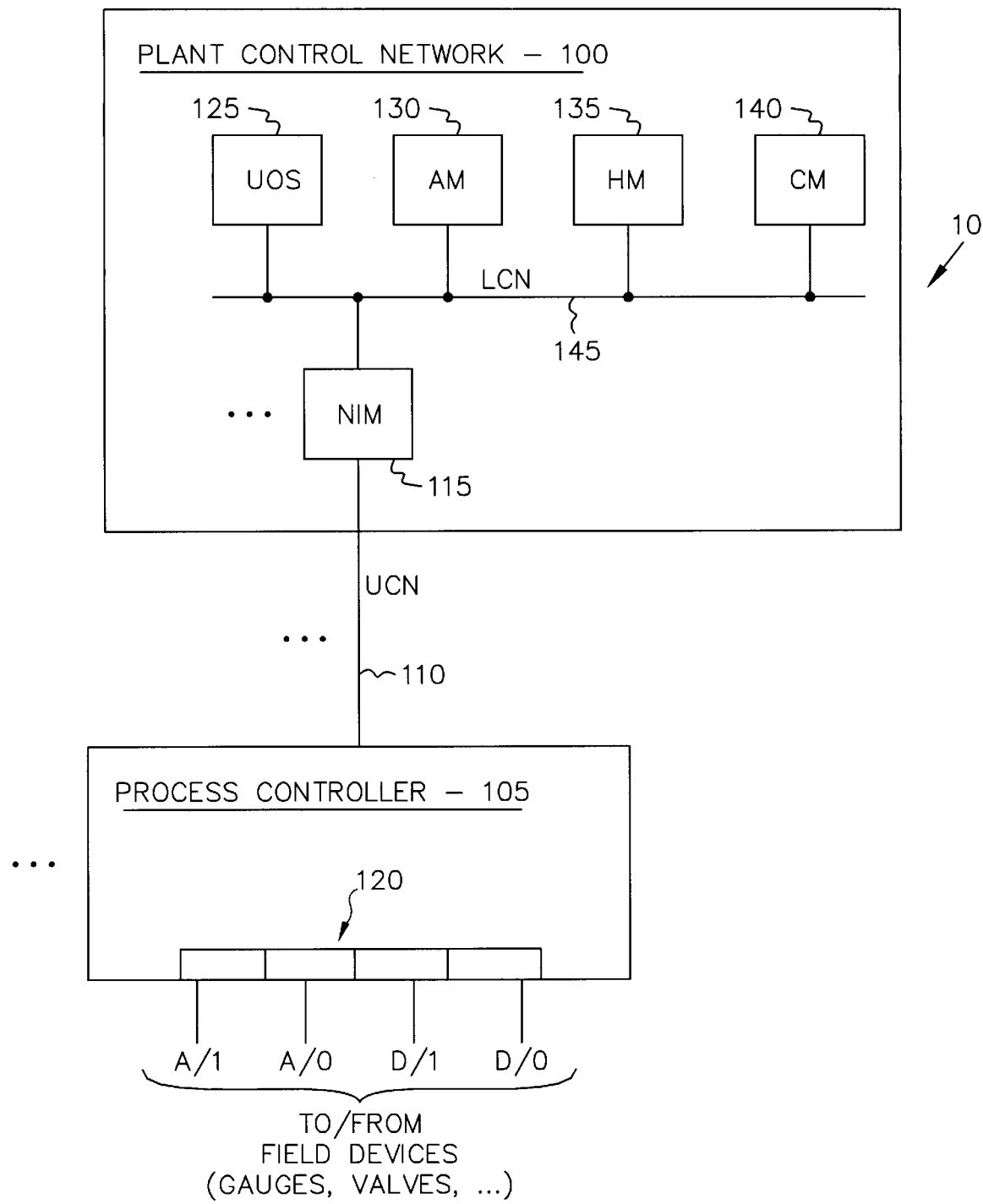
FIG. 1 illustrates a block diagram of an exemplary process control system with which the present invention may suitably be used.

Before undertaking a description of an exemplary embodiment of the systems and methods of the present invention, it will be helpful to describe a computing or processing system environment in which the present invention may suitably be used or implemented. Referring initially to FIG. 1, illustrated is a high-level block diagram of an exemplary process control system (generally designated 10) with which the present invention may suitably be associated.

Process control system 10 illustratively includes a conventional plant control network 100. "Include" or "includes," as either term is used herein, means inclusion without limitation. Plant control network 100 is suitably associated with a process controller 105 via an exemplary universal control network ("UCN") 110. "Associated with," as the phrase, or derivatives thereof, is used herein, may mean to include within, interconnect with, contain, be contained within, connect to or with, couple to or with, be communicable with, juxtapose, cooperate with, interleave, be a property of, be bound to or with, or the like.

Exemplary plant control network 100 illustratively includes a network interface module ("NIM") 115 which is operative to collect data from the UCN for availability to a local control network ("LCN"). Process controller 105 is associated with a plurality of communication interfaces 120 that transmit or receive electric, optic or magnetic signals, such as analog or digital electrical signals, for example. "Or," as the term is used herein, is inclusive, meaning and/or.

According to the exemplary embodiment, communication interfaces 120 are illustratively operative to transmit or receive analog input signals ("A/I"), analog output signals ("A/O"), digital input signals ("D/I") and digital output signals ("D/O"). These exemplary signals may suitably be communicated between plant control network 100 and a variety of conventional field devices (not shown), such as valves, pressure switches, pressure gauges, thermocouples or the like. It should be noted, that the illustrated embodiment includes but a single plant control network 100 and process controller 105. In alternate embodiments of process control system 10, additional process controllers 105 may be operatively connected to plant control network 100 via one or more corresponding UCNs 110 and corresponding NIMs 115. In still further embodiments, process control system 10 may also suitably include a plurality of cooperative plant control networks 100.

Exemplary plant control network 100 provides overall supervision of a controlled process in conjunction with a plant operator. Plant control network 100 obtains all the information needed to perform the supervisory function, and may include an interface (not shown) for interaction with the operator. Plant control network 100 includes a plurality of physical modules, that, in turn, include a universal operator station module ("UOS") 125, an application module ("AM") 130, a history module ("HM") 135, a computing module ("CM") 140 and duplicates of these modules (as well as additional module types, not shown, that may be application dependent) as necessary to perform the required control/supervisory function of the process being controlled. Each of these physical modules is operatively connected to the LCN 145 that permits communication among ones of the modules, as necessary. NIM 115 provides an interface between LCN 120 and UCN 110.

Exemplary UOS 125 of plant control network 100 is a workstation for one or more plant operators, and includes a conventional operator interface or console, such as a graphical user interface ("GUI"), that is the interface between one or more plant operators and the process or processes of the plant for which they are responsible. Each UOS 125, and any conventional backup modules (not shown), for example, is connected to LCN 145, and all communication between UOS 125 and any other module (e.g., NIM 115, AM 130, HM 135, etc.) of plant control network 100, including any backup modules (not shown), is by means of LCN 145. UOS 125 has access to data that is on LCN 145 and the resources and data available through, or from, any of the other modules of plant control network 100. Each UOS 122 may suitably include a conventional video display device, an operator keyboard, a data storage device, such as a floppy disk, CD ROM, hard or other conventional drive, trend pen recorders and status displays, for example (not shown).

Exemplary HM 135 of plant control network 100 suitably provides mass data storage capability. Each HM 135 may include at least one conventional disk mass-storage device, such as a conventional Winchester disk, for example. The disk mass-storage device may provide large volume nonvolatile, non-removable storage of data. The types of data stored by such mass storage devices are typically trend histories or data from which such trends may be determined, data that constitutes or forms displays, copies of programs for the units of the process controller 105 for the modules (e.g., UOS 125, AM 135, etc.) or for units of modules of plant control network 100.

Exemplary AM 130 of plant control network 100 may provide additional data-processing capability in support of process control functions performed by process controllers 105, such as data acquisition, alarm, batch history collection and providing continuous control computational facilities when needed. The data processing capability of AM 130 is provided by an associated conventional module processor and module memory (not shown).

Exemplary CM 140 of plant control network 100 uses standard or common units of all physical modules to enable a medium-to-large scale, general-purpose data-processing system to communicate with other modules (e.g., UOS 125, AM 130, etc.) of plant control network 100 and the units of such modules over LCN 145 and the units of process controller 105 via NIM 115. Conventional data processing systems of CM 140 provide supervisory, optimization, generalized user program preparation and execution of such programs, typically in high-level programming languages. These data processing systems may be capable of communicating with other like systems via conventional communication systems, or networks, and communication lines, as is well known in the art.

Exemplary LCN 120 of plant control network 100 may suitably employ a conventional high-speed, bit serial dual redundant communication bus to interconnect exemplary modules (e.g., UOS 125, AM 130, etc.). Such a bus will provide a principle data transfer path between the data sources, such as NIM 115, AM 130, HM 135, etc., and the principal users of such data, such as UOS 125, AM 130 and CM 140. The bus also provides a suitable communication medium over which large blocks of data, such as memory images, may suitably be moved from one module, such as HM 135, to another, such as UOS 125.

It should be noted that each physical module (e.g., UOS 125, AM 130) of plant control network 100 of the illustrated embodiment may include certain standard units. A more complete description of an advantageous plant control network 100 and such physical modules may be found in U.S. Pat. No. 4,607,256 (the "'256 Patent") which is incorporated herein by reference for all purposes.

Exemplary CM 140 may include any conventional suitably arranged computer, or plurality of computers. One exemplary computer is the Honeywell DPS-6, which has been used in CM 140, and which is available from Honeywell Inc. of Minneapolis, Minn. Currently, CM 140 of process control network 100, that uses the systems and methods of the present invention, includes a conventional Hewlett-Packard ("HP") PA-RISC system, which is available from Hewlett-Packard of 3000 Hanover St., Palo Alto, Calif. 94304.

Optimization, modeling, statistical analysis and other like procedures are associated with process control system 10. These procedures generally operate on data and output the results generated therefrom. The data is generally available through some predetermined files, subprocedures or the like. The system and method of the present invention integrate the procedures into the process control system 10 by essentially defining (or redefining) multiple data sources and destinations, thereby making the necessary input data available to the procedures and providing a way of outputting the data of the application program to the process control system. A "procedure," as the term is used herein, means a manner, way or series of steps of proceeding, performing or effecting something using a computer, including functions, routines, subroutines, tasks, algorithms, programs, threads, or the like.

Figure 2:
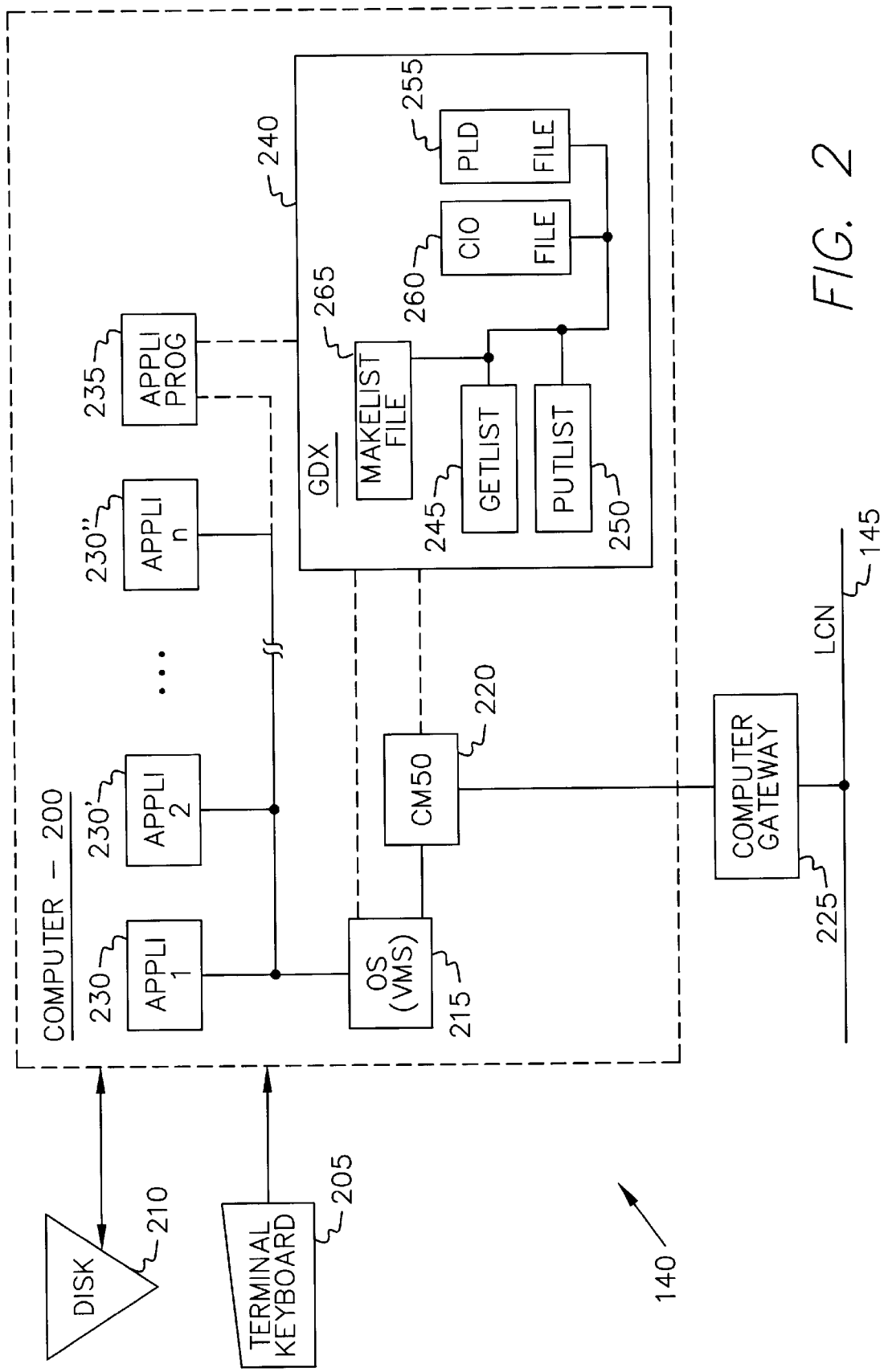
FIG. 2 illustrates a block diagram of an exemplary computing, or processing, module of the process control system of FIG. 1 for providing dynamic data referencing according to the principles of the present invention.

Turning now to FIG. 2, illustrated is a functional block diagram of an exemplary CM (generally designated 140) that may be suitably arranged to include the systems and methods of providing dynamic data referencing of the present invention. Exemplary CM 140 includes a conventional computer or processing system 200 that is suitably associated with a terminal keyboard 205 and an external storage device 210. Exemplary keyboard 205 and storage device 210 are included for illustrative purposes, and those of ordinary skill in the art will recognize that additional devices may be used in place of or combination with the foregoing.

In an advantageous embodiment, computer 200 of CM 140 is the HP PA-RISC machine discussed above, the HP PA-RISC machine is operable to execute an associated operating system ("OS") 215, such as HP-UX, for example. A suitable interface program ("LXS") 220 interfaces (i.e., enables communication therebetween) software packages executable in association with computer 200 and OS 215 with one or more conventional hardware peripherals (not shown) via conventional gateway 225 and exemplary LCN 145. Such communication is preferable according to an accepted communication protocol.

Exemplary computer system 200 includes a plurality of executable programs or software packages, such as application programs 230, 230', 230" and 235 and a Generic Data Exchange ("GDX") package 240 that implements and is responsible for control logic of the present invention. Exemplary GDX package 240 includes executable programs and files, such as a GETLIST program 245, a PUTLIST program 250, a point list definition ("PLD") file 255, a control input/output ("CIO") file 260, and a MAKELIST program 265.

For the purposes of illustration, assume that exemplary application program ("APPLI PROG") 235 is written, created or the like according to conventional HP/HP-UX environment standards and protocols, i.e., without knowledge or regard to iteration or communication with process control system 10 of FIG. 1 and, more specifically, to iteration or communication with LCN 145, such as by a third-party software vendor. According to the illustrated embodiment, individual CIO file 260 and PLD file 255 may exist for each application program 235 associated with computer 200.

According to the teachings of Bland et al., U.S. Pat. No. 5,333,298 (the "'298 Patent"), entitled "System for Making Data Available to an Outside Software Package by Utilizing a Data File which Contains Source and Destination Information," the procedure portion of APPLI PROG 235 may suitably remain intact. The '298 Patent is incorporated herein by reference for all purposes.

Thus, an operator, using terminal keyboard 205, for example, may interact with CM 140 by identifying a source and destination in process control system 10 of previously-identified application program variables of APPLI PROG 235. The operator may further specify one or more operations to be performed with the data obtained and the format of the data (i.e., whether the data needs to be translated from or into a format required by APPLI PROG 235). This information may compose PLD file 255. Exemplary MAKELIST program 265 may be used in an "offline" mode (i.e., APPLI PROG 235 is not executing). From the information contained in PLD file 255, MAKELIST program 265 may obtain specific information that is used during application execution discussed in the '298 Patent. From this information, CIO file 260 is generated. In this manner, data may be obtained and placed in a stored location in memory in which APPLI PROG 235 is expecting to see the same during execution.

Those of ordinary skill in the art will recognize that these files or stored memory locations may be generated by a variety of methods using many different computer, or processing, system platforms. In alternate advantageous embodiments, computer 200, in whole or in part, may be replaced by, or combined with, any other suitable processing circuitry, including programmable logic devices, such as programmable array logic ("PALs") and programmable logic arrays ("PLAs"), digital signal processors ("DSPs"), field programmable gate arrays ("FPGAs"), application specific integrated circuits ("ASICs"), very large scale integrated circuits ("VLSIs") or the like, to form the various types of circuitry and computer, or processing, systems described and claimed herein.

Conventional computer, and processing, system architecture is more fully discussed in *Computer Organization and Architecture,* by William Stallings, MacMillan Publishing Co. (3rd ed. 1993); conventional processing system network design is more fully discussed in *Data Network Design,* by Darren L. Spohn, McGraw-Hill, Inc. (1993); and conventional data communications is more fully discussed in *Data Communications Principles,* by R. D. Gitlin, J. F. Hayes and S. B. Weinstein, Plenum Press (1992) and in *The Irwin Handbook of Telecommunications,* by James Harry Green, Irwin Professional Publishing (2nd ed. 1992). Each of the foregoing publications is incorporated herein by reference for all purposes.

Figure 3:
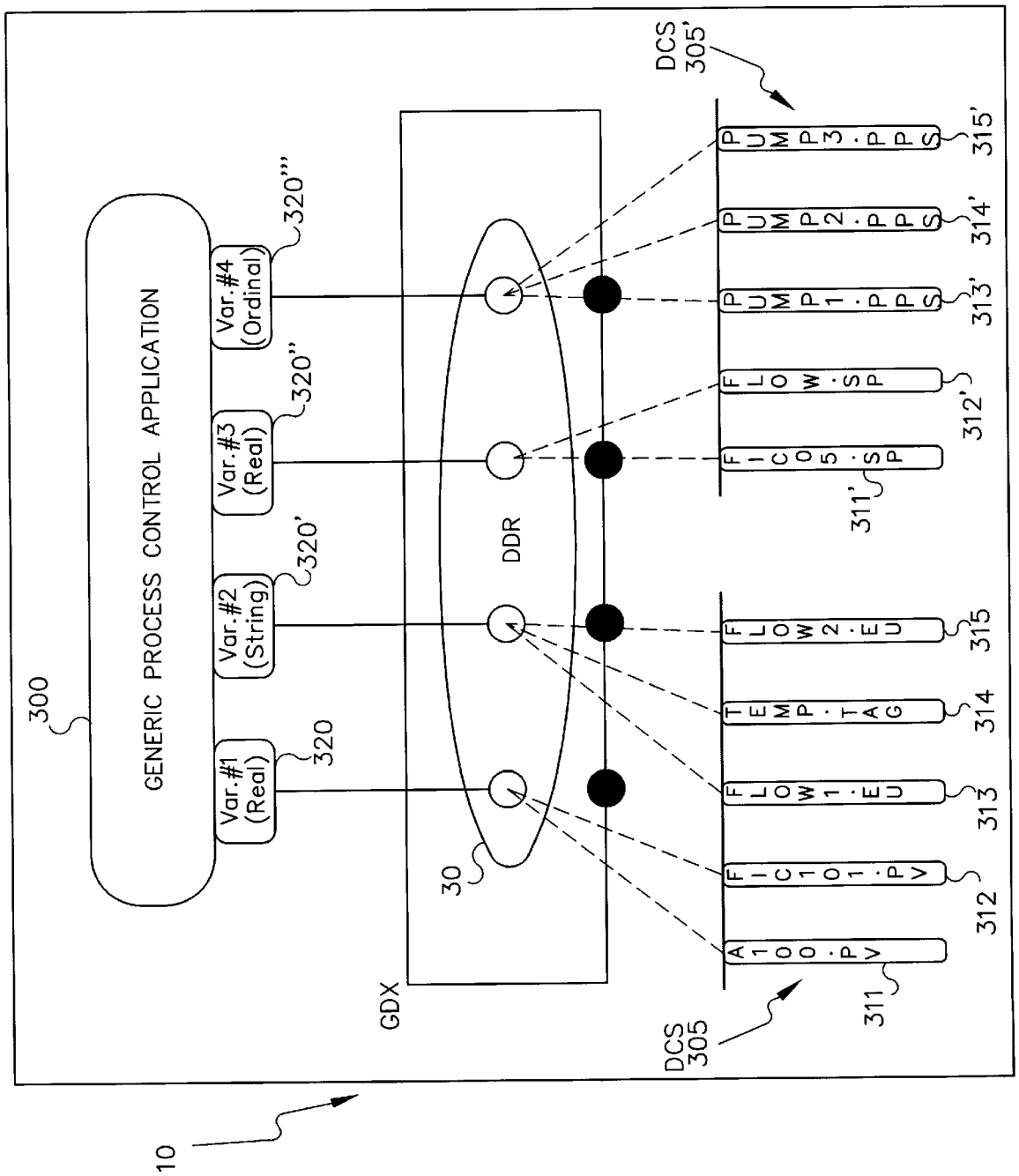
FIG. 3 illustrates a functional diagram of an exemplary dynamic data referencing module of the process control system of FIGS. 1 and 2 according to the principles of the present invention.

Turning now to FIG. 3, illustrated is a high-level functional diagram of an exemplary DDR module 30 of process control system 10 of FIGS. 1 and 2. DDR module 30 is illustratively associated with exemplary GDX 240 of FIG. 2, as well as with a generic process control application 300 and two exemplary distributed control systems ("DCS"), namely DCS 305 and DCS 305'. Although only two DCSs are shown, those skilled in the art will realize that this is not indicative of limitation.

Each exemplary DCS 305, 305' includes five data references (311 to 315 and 311' to 315', respectively) illustratively representing physical, logical or like characteristics of some associated data source. Each set of five data references 311 to 315 and 311' to 315', respectively, is divided into two illustrative sub-sets 305 and 305', respectively. Although only two sub-sets of data references are shown, those skilled in the art will realize that this is an illustration and not indicative of limitation.

Exemplary generic process control application 300 includes one or more process procedures (not shown) that operate on and are specified in terms of one or more generic variables, namely, illustrative variables 320, 320', 320" and 320'". Exemplary generic variables 320 to 320'" are dynamically bound with the external data references 311 to 315' according to the present invention.

DDR module, or routine, 30 facilitates instantiation, or creation, of one or more alias variables (not shown) for at least some of the plurality of generic variables 320 to 320'''. The alias variables are suitably adapted to identify an associated, or given, external data reference 311 to 315'. Generic process control application 300 employs the alias variable at runtime according to the present invention to request DDR module 30 to bind particular generic variables 320 to 320''' to particular external data references 311 to 315' to allow communication of data between application 300 and each of exemplary DCSs 305, 305'.

Generic process control application 300 is, in other words, specified in terms of operations on generic variables 320 to 320''' that comprise a control data template defined using DDR module constructs. In the above-given exemplary embodiment, instantiation of the control data template using DDR module 30 results in data being illustratively accessed from two exemplary DCSs 305, 305' and in multiple external data reference bindings for each alias variable within the template.

Figure 4:
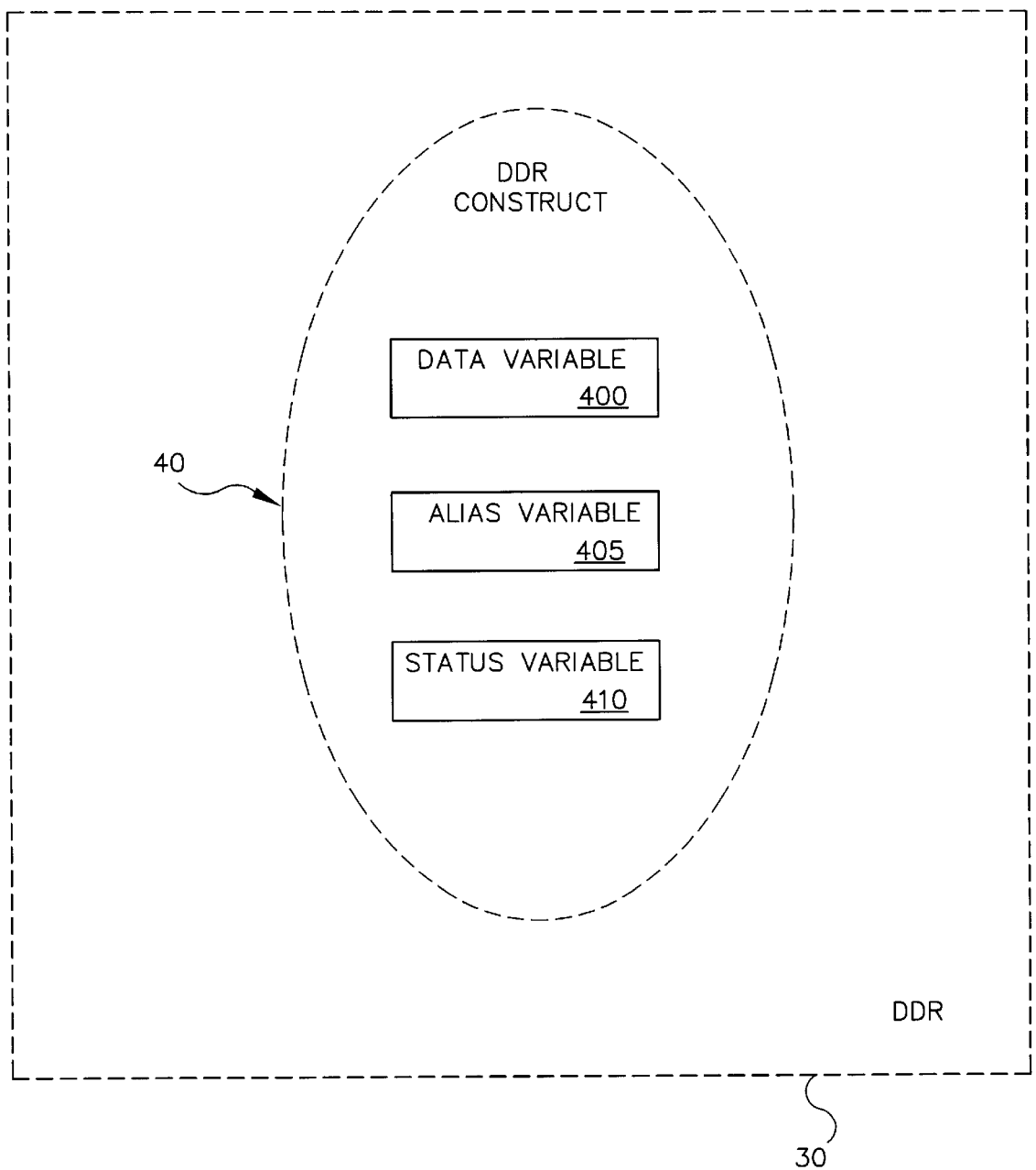
FIG. 4 illustrates a functional diagram of an exemplary dynamic data referencing construct of the dynamic data referencing module of FIG. 3 according to the principles of the present invention.

Turning to FIG. 4, illustrated is a high-level functional diagram of an exemplary DDR construct (generally designated 40) of DDR module 30 of FIG. 3 according to the principles of the present invention. Exemplary DDR construct 40 is illustratively associated with each of a data variable 400, an alias variable 405 and a status variable 410. Exemplary data variable 400 may be an application variable that holds data to be operated on to fulfill generic process control application 300 required functionality—the stored data may be accessed using GDX 240. Exemplary alias variable 405 may be an application variable that holds an identifier, such as a name, of at least one of exemplary external data references 311 to 315' for which data access may dynamically be associated therewith—the ability to specify this entity suitably enables DDR. Exemplary external reference status variable 410 may be an application variable that holds the status of any dynamic binding between alias variable 405's associated external data reference (i.e., any of 311 to 315') and associated data variable 400.

According to the illustrated embodiment, a "current" reference name for each alias variable 405 may be stored in a memory, and may suitably be changed at any time—external data references may dynamically be changed by: (1) loading a valid external reference component into a subject alias variable 405, and (2) selecting a "next" external data reference as a function of subject alias variable 405.

More particularly, the alias variable loading step may suitably include using conventional constructs provided by a high-level programming language, such as C, FORTRAN or other like suitably arranged programming languages, for example, to place a string, such as in ASCII format, into alias variable 405. Should alias variable 405 be loaded with a predefined null value (i.e., a negligible value, no information, void, etc.), then an attempted modification of one or more external data references associated with the same at run-time should not cause an error. Rather, a null reference is treated as an "available" alias variable 405 (i.e., one presently not being used). Thus, the call to the same at run-time is not an error, although status variable 410 may suitably include information identifying the same as null.

Focusing attention on the "next" external data reference selection step, it may suitably include moving external reference name components associated with alias variables 405 to memory, resolving and validating all external references updated with new external reference names to thereby establish a new external data reference binding, and moving status values associated with the resolution and validation of external data references into external reference status variables 410.

In the event that an external data reference fails to successfully resolve and validate, a status value may be returned that reflects error. Individual external reference status variables 410 may contain status values for each external data reference modified, and external reference names kept in memory may suitably reflect the name of any external reference causing error.

Once modification of the external references is completed, a suitable data access operation may be performed to use the "new" external references to access "new" external data. For those external references encountering errors during attempted modification, (1) external data may not be accessed for data variables 400 associated with the external data references causing errors, and (2) a "not bound" indicator may suitably be returned indicating no external reference binding occurred for an associated data variable 400 due to an error encountered during attempted modification e.g., an error status may be returned.

In an advantageous embodiment, as set forth hereinabove, if "null" external data references are created (e.g., indicating that a particular alias variable 405 is available), then, when used at data access, may cause: (1) external data not to be accessed for data variables 400 associated with external data references set to null, and (2) a "not bound" indicator may suitably be returned indicating no external reference binding occurred for the data variable 400.

It should be noted that the above-described ability to set alias variables 405 to null may suitably occur before instantiation of DDR construct 40 and may thereafter be modifiable, or may occur at or during run-time using the DDR mechanism of the present invention. Thus the dynamic nature of DDR provides the application developer with improved flexibility and functionality with respect to external data references at run-time.

According to the illustrated embodiment, process control application developers incorporating DDR construct principles may define DDR components within generic process control application 300. DDR components may consist of application variables that represent the various parts of a complete DDR construct 40. The collection of all DDR constructs defines a generic process control application 300's dynamic data template. Instantiation of this template suitably occurs, and is thereafter modifiable, at, and during, run-time using the DDR mechanism of the present invention.

Exemplary FIGS. 3 and 4 collectively illustrate a generic process control application 300 that may suitably be instantiated by data bound to it via DDR module 30. This provides a flexible and reusable application that may be deployed by separating a particular procedure that is generic in its composition from the specific source/destination of the data that drives it.

Turning to FIG. 5, illustrated is an exemplary listing of a relevant portion of source code (generally designated 50) of an exemplary generic control process application 300. Source code listing 50 is illustratively associated with exemplary DDR construct 40 and exemplary DCS 305, 305' and includes four exemplary program listing subsections 500 to 515.

First exemplary subsection 500 includes a plurality of conventional variable definitions. Subsection 50 provides a suitable means for establishing a DDR construct 40 according to the principles of the present invention. "AliasVar [10]," "FlowRate" and "ExtRefStatus" respectively illustrate alias variable 405, data variable 400 and external data reference status variable 410.

Second exemplary subsection 505 includes at least one DDR program instruction illustratively executable to bind to an external data reference or source, such as any of external data references 311 to 315' of FIG. 3, by identifying, specifying, pointing to, etc., an external data reference name associated with exemplary alias variable 405 and invoking exemplary DDR module 30 through an OpenDDA Application Programming Interface ("API") of the illustrated embodiment. Status indicia may suitably be returned to generic control process application 300 indicating success or failure of the attempted binding and stored in exemplary status variable 410.

Note that subsection 505 includes an "EXEC DDA MODIFY CIO" command. This command may suitably be used to select new external data references. According to the present embodiment, an alias variable 405 should be associated with the name of new external data prior to invoking this command, otherwise an error condition may occur. Recall that if alias variable 405 is set to null, then execution of this command will indicate that alias variable 405 is available.

In an advantegious embodiment, an optional modify code variable may suitably be defined and used to determine whether or not external data reference names will be updated using one or more alias variables 405 by execution of a next "EXEC DDA MODIFY CIO" command. Modify code variables may suitably be validated during execution of the command, and if an invalid modify code is detected, any associated external data reference contained in an associated alias variable 405 will not dynamically be selected—the modify will not take place; any subsequent alias variable 405 load statements will return previous external reference component values; and any external data reference status variable 410 will be set to indicate that the external reference is indeterminate.

Third exemplary subsection 510 includes one or more program instructions illustratively executable, after generic process control application 300 verifies that the binding succeeded, to access exemplary data variable 400, which in this example equals 76.45, using the OpenDDA API and GDX of the illustrated embodiment.

Fourth exemplary subsection 515 includes a conventional program instruction illustratively executable to perform some conventional operation upon the received data stored in data variable 400.

Exemplary alias variable 405 therefore enables generic process control application 300 to associate one or more data variables 400 with one or more external data references 311 to 315' at run-time. An external data statement is used to associate one or more native high level language variables of generic process control application 300 with one or more of the various components, or properties, of one or more external data references 311 to 315', and to associate the one or more native high level language variables with a selection set. A normal, or conventional, building of the application is performed, and at run-time the name of one or more desired external data references is associated with one or more alias variables, and the same is communicated with transferring data between application 300 and external data reference 311 to 315'.

According to the illustrated embodiment, the mechanics of the present invention are realized through an implementation of modular software components that use current GDX technology defined by the '298 Patent. Using the constructs that were defined at build-time, DDR is activated by the invocation of specific procedures programmed within the standard OpenDDA API. A primary operation of DDR is to bind new external data references to generic process control application 300's operating data variables 400.

In the illustrated embodiment, in addition to the foregoing, DDR may also suitably provide, preferably through API, each of persistent storage of runtime-determined bindings for later reuse, query capability of current dynamic bindings (i.e., external reference names—aliases) in effect for a given application, specialized control of binding mechanism for each DDR construct, and the like.

From the above, it is apparent that the present invention provides, for use with a computer system having a DDR module, a plurality of external data references accessible via the DDR module, the computer system capable of executing a user application that operates on a plurality of generic variables, a system and method for dynamically binding the external data references to the generic variables. The system includes a DDR routine within the user application that allows creation of an alias variable for at least some of the plurality of generic variables. The alias variable is adapted to identify a given external data reference. The user application employs the alias variable at runtime to request the DDR module to bind a given generic variable to the given external data reference to allow communication of data between the user application and the external references.

A preferred implementation is presently commercially available from Honeywell Inc., of Phoenix, Ariz., namely, Open DDA Developer's Kit, MP-SWDDA1, Part No. 51151515. The principles of DDR according to this implementation are discussed in detail in each of "OpenDDA Reference Manual," DD27-200, pp. 65 to 90, 97, 111 to 116 and 121 to 128, and "OpenDDA User's Guide," DD11-200, pp. 93 to 110, both of which are available from Honeywell Inc. of Phoenix, Ariz., and more particularly, by contacting PSC DISTRIBUTION, 2500 W. Union Hills, Phoenix, Ariz. 85027, and which are incorporated herein by reference for all purposes.

Although the present invention and its advantages have been described in detail, those skilled in the art should understand that they can make various changes, substitutions and alterations herein without departing from the spirit and scope of the invention in its broadest form.

What is claimed is:

1. For use with a computer system having a dynamic data referencing (DDR) module, a plurality of external data references accessible via said DDR module, said computer system capable of executing a user application that operates on a plurality of generic variables, a system that dynamically binds said external data references to said generic variables, comprising:

a DDR interface routine within said user application that allows creation of an alias variable for at least some of said plurality of generic variables, said alias variable adapted to identify a given external data reference, said user application employing said alias variable at runtime to request said DDR module to bind a given generic variable to said given external data reference to allow communication of data between said user application and said external references, an external data statement being used to associate at least one of said generic variables of said user application with at least one of said external references and a selection set.

2. The system as recited in claim 1 wherein said DDR routine further allows creation of a data variable, said data variable adapted to contain a value of a given external data reference.

3. The system as recited in claim 1 wherein said DDR routine further allows creation of an external reference status variable, said external reference status variable adapted to contain a status of a binding between said given generic variable and said given external data reference.

4. The system as recited in claim 1 wherein said DDR routine stores runtime-determined bindings for reuse.

5. The system as recited in claim 1 wherein said DDR routine stores an indication of current runtime-determined bindings in effect for said user application.

6. The system as recited in claim 1 wherein said DDR routine is associated with a plurality of separate user applications executing on said computer system.

7. The system as recited in claim 1 wherein said alias variable is set to a null value.

8. The system as recited in claim 7 wherein use of said null value indicates that said alias variable is available.

9. The system as recited in claim 1 wherein said computer system is a portion of a real-time, process control system, said external data references corresponding to sensors and controllable devices of said process control system.

10. For use with a computer system having a dynamic data referencing (DDR) module, a plurality of external data references accessible via said DDR module, said computer system capable of executing a user application that operates on a plurality of generic variables, a method of operating said computer system to dynamically bind said external data references to said generic variables, comprising the steps of:

creating an alias variable for at least some of said plurality of generic variables with a DDR interface routine within said user application, said alias variable adapted to identify a given external data reference;

employing said alias variable at runtime to request said DDR module to bind a given generic variable to said given external data reference to allow communication of data between said user application and said external references; and employing an external data statement to associate at least one of said generic variables of said user application with at least one of said external references and a selection set.

11. The method as recited in claim 10 further comprising the step of creating a data variable, said data variable adapted to contain a value of a given external data reference.

12. The method as recited in claim 10 further comprising the step of creating an external reference status variable, said external reference status variable adapted to contain a status of a binding between said given generic variable and said given external data reference.

13. The method as recited in claim 10 further comprising the step of storing runtime-determined bindings for reuse with said DDR routine.

14. The method as recited in claim 10 further comprising the step of storing an indication of current runtime-determined bindings in effect for said user application with said DDR routine.

15. The method as recited in claim 10 wherein said DDR routine is associated with a plurality of separate user applications executing on said computer system.

16. The method as recited in claim 10 further comprising the step of setting said alias variable to a null value.

17. The method as recited in claim 16 further comprising the step of indicating that said alias variable is available as a function of said null value.

18. The method as recited in claim 10 wherein said computer system is a portion of a real-time, process control system, said external data references corresponding to sensors and controllable devices of said process control system.

19. A real-time, process control system, comprising:

a computer system capable of executing a user application that operates on a plurality of generic variables;

a plurality of sensors and controllable devices coupled to said computer system via a data bus, each of said plurality of sensors and controllable devices having a corresponding external data reference associated therewith;

a dynamic data referencing (DDR) module associated with said computer system, said DDR module allowing access by said computer system to said external data references; and a DDR interface routine within said user application that allows creation of an alias variable for at least some of said plurality of generic variables, said alias variable adapted to identify to a given external data reference, said user application employing said alias variable at runtime to request said DDR module to bind a given generic variable to said given external data reference to allow communication of data between said user application and said external references, an external data statement being used to associate at least one of said generic variables of said user application with at least one of said external references and a selection set.

20. The system as recited in claim 19 wherein said DDR routine further allows creation of a data variable, said data variable adapted to contain a value of a given external data reference.

21. The system as recited in claim 19 wherein said DDR routine further allows creation of an external reference status variable, said external reference status variable adapted to contain a status of a binding between said given generic variable and said given external data reference.

22. The system as recited in claim 19 wherein said DDR routine stores runtime-determined bindings for reuse.

23. The system as recited in claim 19 wherein said DDR routine stores an indication of current runtime-determined bindings in effect for said user application.

24. The system as recited in claim 19 wherein said DDR routine is associated with a plurality of separate user applications executing on said computer system.

25. The system as recited in claim 19 wherein said alias variable is set to a null value.

26. The system as recited in claim 25 wherein said null value is used to indicate that said alias variable is available.

* * * * *